United States Patent Office 3,299,871
Patented Jan. 24, 1967

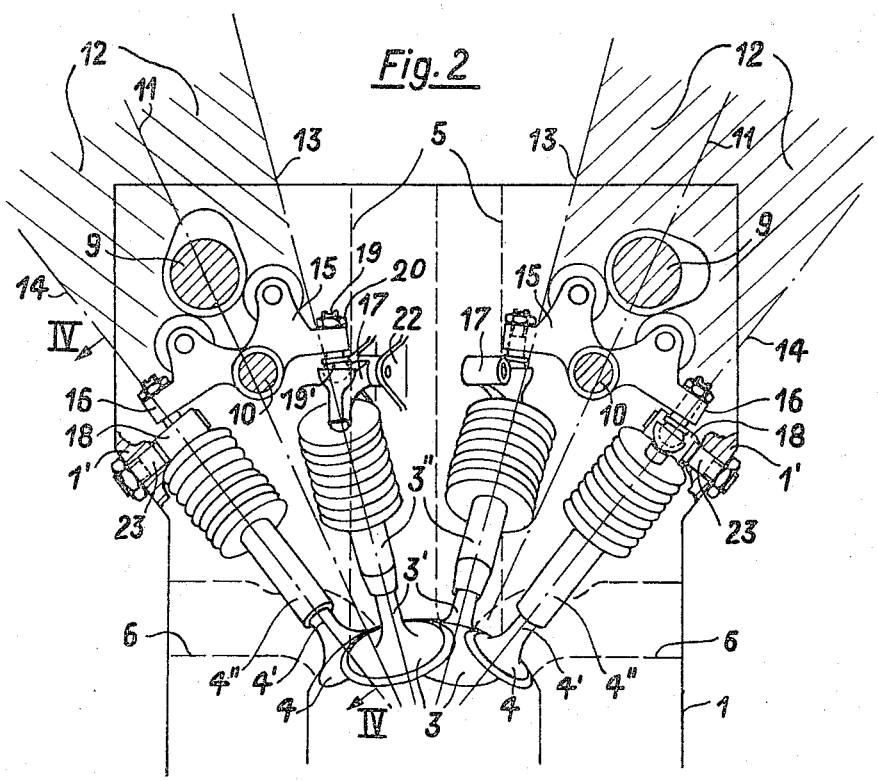
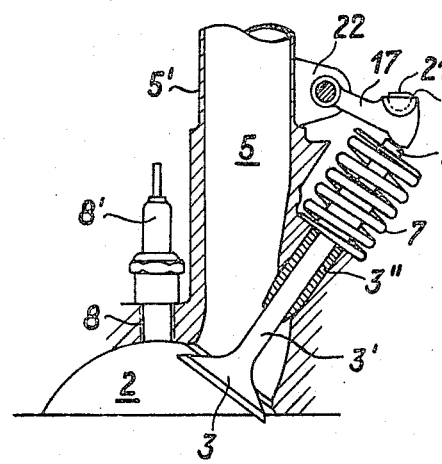
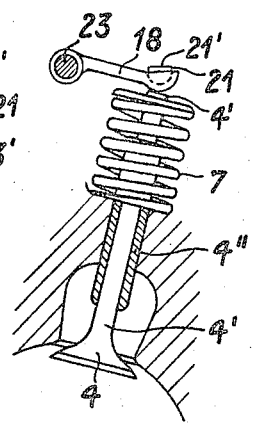

3,299,871
VALVE CONTROL FOR INTERNAL
COMBUSTION ENGINES
Ludwig Apfelbeck, Munich, Germany, assignor to
Bayerische Motoren Werke A.G., Munich, Germany
Filed Apr. 1, 1966, Ser. No. 539,392
Claims priority, application Germany, Apr. 3, 1965,
B 18,299
19 Claims. (Cl. 123—90)

The present invention relates to a valve control for internal combustion engines having at least one row of cylinders which includes, for each cylinder, four overhead valves arranged in V-formation; namely, two oppositely disposed inlet and outlet valves each, whereby the planes determined by the axes of the oppositely disposed valves are rotated with respect to the longitudinal center plane or the transverse plane extending through the cylinder axes by an angle of about 15° to 30° about the cylinder axes and whereby the valves arranged to one side of the longitudinal center plane are actuated by a cam shaft of their own by way of a rocker arm abutting against the cam shaft and a rocker arm abutting against the valve.

Such a valve control has no greater space requirement in length and width thereof than types of constructions having two overhead valves in V-formation for each cylinder. However, such a valve control enables both for full load operation as well as also for partial load operation favorable gas exchange conditions and therewith a high specific output owing to a good filling degree, even at the highest rotational speeds, as well as high torque values already starting with relatively low rotational speeds. The reciprocating masses, i.e., the masses thereof which move to and fro, of this valve control are very small, in particular, since the individual valves are small in relation to the cylinder volume favors the ability of the valve mechanism to operate satisfactorily at high rotational speed. A known construction of this type according to the Austrian Patent 174,503 still entails the disadvantage of a complicated construction, especially as regards number and spatial arrangement of the rocker arm bearing places. Additionally, with this prior art construction a very considerable structural height exists by reason of the long push rods between the two drag levers actuating a valve.

The present invention eliminates these shortcomings by the features to be more fully described herein and defined by the appended claims, and enables a neat, space-saving, and thereby kinematically correct construction of the control elements together with the bearing places thereof. Neither in width nor in length and also not in height does the control arrangement according to the present invention require more space than is necessary with the customary two-valve constructions having overhead valves arranged in V-formation. Even the bearing places for the rocker arms abutting at the valves are arranged in a simple, spacious lay-out; namely, those for the gas channels or ducts extending in the direction of the cylinder axes tangentially to the associated channel or duct walls and those for the radially extending gas channels or ducts perpendicularly to a side wall section of the cylinder head inclined parallelly to the associated valves as viewed in the longitudinal direction of the cylinder row. Special bearing supports or mounts for the rocker arms are not required with the arrangement of the present invention.

Accordingly, it is an object of the present invention to provide a valve control arrangement for internal combustion engines which is simple in construction yet avoids the aforementioned shortcomings and drawbacks encountered with the prior art constructions.

Another object of the present invention resides in a valve control for internal combustion engines having per cylinder four overhead valves arranged in radial V-formation which permits a simple construction and lay-out of all of the control and actuating parts resulting in a neat spatial arrangement that is easily accessible for purposes of servicing and repairs.

A further object of the present invention resides in a valve control for internal combustion engines having per cylinder four overhead valves arranged in radial V-formation, in which the number and spatial arrangement of the bearing places for the rocker arms is greatly simplified while at the same time the spatial requirements are reduced as to width, length and height compared to the prior art constructions.

These and further objects, features, and advantages of the present invention will become more obvious from the following description when taken in connection with the accompanying drawing which shows, for purposes of illustration only, one embodiment in accordance with the present invention, and wherein:

FIGURE 2 is a transverse cross-sectional view of the valve control according to FIGURE 1;

FIGURE 3 is a partial cross-sectional view taken along line III—III of FIGURE 1; and FIGURE 4 is a further partial cross-sectional view taken along line IV—IV of FIGURE 2.

Figure 1:
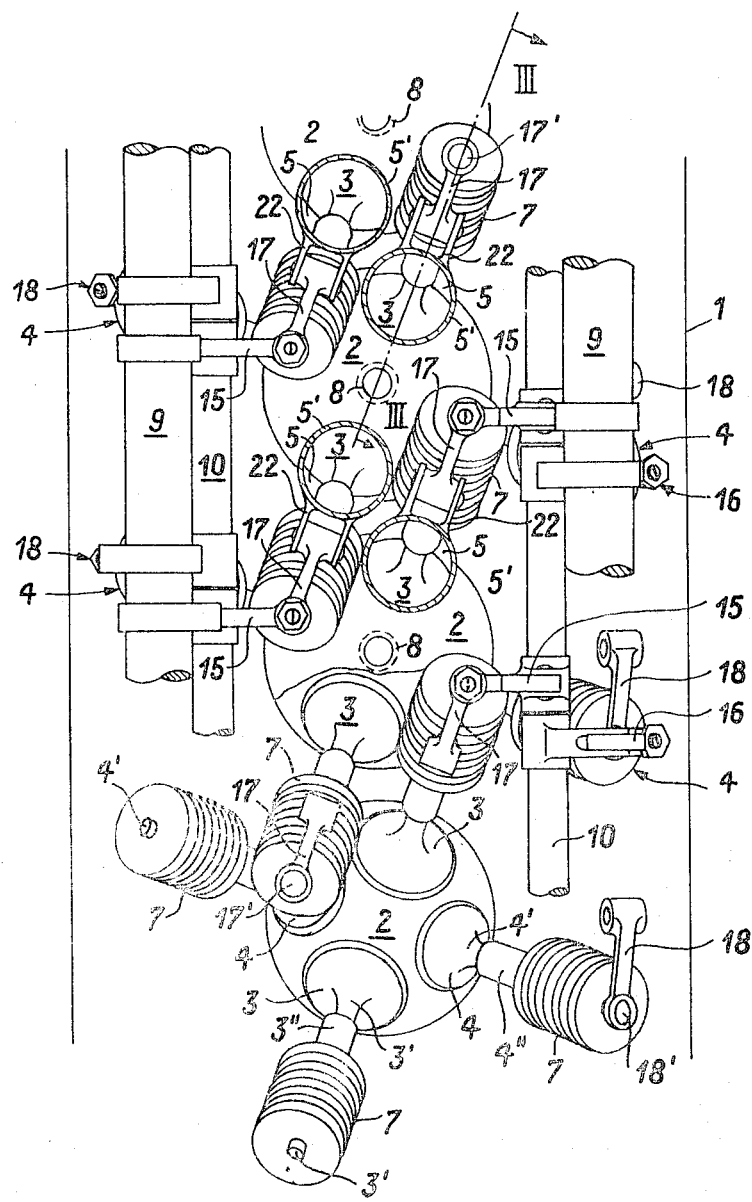
FIGURE 1 is a partial schematic top plan view on a valve control for a multi-cylinder, in-line internal combustion engine in accordance with the present invention.

Referring now to the drawing wherein like reference numerals are used throughout the various views to designate like parts, reference numeral 1 designates an internal combustion engine having a plurality of cylinders; one hemispherically shaped combustion space 2 with four valves 3, 4 is provided for each cylinder of a respective cylinder row. Two valves per cylinder for the control of the suction channels 5, which extend parallel to the cylinder axis, are constructed as inlet valves 3 which are disposed mutually opposite one another. The two exhaust valves 4 per cylinder, also disposed mutually opposite one another, control the exhaust channels 6 discharging approximately radially to the cylinder axes. The valve stems 3', 4' and the valve guide means 3'', 4'' of all valves 3, 4 are arranged so as to diverge obliquely (FIG. 2) and form, as viewed in plan view of FIGURE 1, a rectangular cross. The valves 3, 4, i.e., the cross formed by the valve stems 3', 4' thereof are rotated with respect to the longitudinal center plane of the corresponding cylinder row by an angle of about 20 to 25° so that the cylinders, unimpaired by valves and the springs 7 thereof, may be moved as close to each other as is possible for other constructional reasons. The valve stem 3' and 4' and the associated valve springs 7 of one cylinder thereby engage or extend between the valve stems and valve springs of the respective adjacent cylinder or cylinders without impairing the same as to freedom of movement thereof. One cam shaft 9 and one bearing shaft 10 each are arranged for the purpose of the control of the valves on each side of the longitudinal center plane of the respective cylinder row which longitudinal center plane is determined in FIGURE 1 by the axes of the spark plug threads 8; more particularly, the axes of the cam and bearing shafts 9 and 10 are located on the approximately angle-bisecting longitudinal plane 11 (FIG. 2) of an angular space 12 each which is subtended and defined by the inclined longitudinal planes 14 and 13, respectively, determined by the axes of the outlet valves 4, on the one hand, and by the axes of the inlet valves 3, on the other. Roller-type rocker arms 15, 16 abutting from both sides in a scissor-like manner against the cam shaft 9 are supported on the bearing shafts 10; the roller-type rocker arms 15, 16 engage by way of further rocker arms 17, 18, on the one hand, with the valve stems 3' of the inlet valves 3 and, on the other, with the valve stems 4' of the outlet valves 4. An adjusting screw 19 having a lock nut 20 and flat abutment surface 19' as well as a flattened ball 21 are each interposed between the cooperating rocker arms 15 and 17 and the cooperating rocker arms 16 and 18. The balls 21 are supported with the spherical surfaces thereof in spherically shaped sockets 17', 18' of the rocker arms 17, 18, respectively, and abut, with surface contact with the flattened portions 21' thereof, against the surfaces 19' of the adjusting screws 19. This ball 21 equalizes the different angular positions of the ends of the respectively cooperating rocker arms 15, 17 and 16, 18 by the pivot movements thereof within the spherically shaped sockets 17', 18'. With approximately half the valve-actuation stroke, the surface 19', 21' coincides with a longitudinal plane which intersects both the center axis of the bearing shaft 10 for the rocker arms 15, 16 as also the center axis of the bearing places for the rocker arms 17 or 18. In this manner, the friction movements and therewith frictional loads between the surfaces 19' and 21' are kept as small as possible as the abutment surfaces 19', 21', starting from the rectangular position thereof with respect to the direction of movement, carry out only slight transverse displacements as a result of the circular path thereof. Consequently, relatively short push rods could also be used therefor in lieu of the ball 21, without any significant increase in constructional height. Bearing places 22 are formed into the walls of the suction channels 5 for the rocker arms 17 whose center axes are disposed approximately tangentially to the axis of the suction channel 5 within a horizontal, longitudinal plane. The rocker arms 18 are guided by means of bearing bolts 23 which are secured at the outer wall 1' (FIG. 2) of the cylinder head. The rocker arms 15, 16 of the directly adjacent suction valves 3 and exhaust valves 4 of two adjoining cylinders are, by reason of the overlap of the valve stems 3', 4' in the longitudinal direction, arranged adjacent one another on the bearing shafts thereof in reverse sequence from the cylinders. The rocker arms 17, 18 have the bearing places thereof, as viewed in the longitudinal direction, on the side of the valves 3 or 4 facing the respective cylinder axis. A space-saving arrangement in the longitudinal direction results therefrom for the two rocker arm pairs of the respectively directly adjacent inlet valves 3 and exhaust valves 4 which enables a good accessibility to the cylinder head bolts and leaves sufficient space for the arrangement of wide bearing supports or mounts for the cam shafts 9 and the bearing shafts 10 between these rocker arms 15, 16 and 18.

While I have shown and described one embodiment in accordance with the present invention, it is understood that the same is not limited thereto but is susceptible of numerous changes and modifications as known to a person skilled in the art and I therefore do not wish to be limited to these details but intend to cover all such changes and modifications as are encompassed by the scope of the appended claims.

I claim:

1. A valve control for internal combustion engines having at least one cylinder row, which include per cylinder four overhead valves radially arranged in V-formation with two inlet and exhaust valves each disposed mutually opposite one another, comprising four valve means per cylinder each including stem means, the planes determined by the axes of oppositely disposed valve means being rotated with respect to the longitudinal center plane by a predetermined angle, separate cam shaft means for the valve means disposed on respective sides of the longitudinal center plane, rocker arm means abutting against respective cam shaft and valve means for actuating the valve means from the corresponding cam shaft means, the cam shaft means being arranged within the angular spaces which are defined by the longitudinal center planes determined by the inlet valve stem means, on the one hand, and the outlet valve stem means on the other of the valve means actuated by the corresponding cam shaft means, and common bearing shaft means for the valve means actuated by a respective cam shaft means and arranged within the same angular space but closer to the apex of the angle thereof than the corresponding cam shaft means for supporting thereon the rocker arm means.

2. The combination according to claim 1, wherein said predetermined angle is about 15 to 30°.

3. The combination according to claim 2, wherein two rocker arm means are provided for the actuation of each valve means which abut against the cam shaft means and against the valve means, respectively.

4. The combination according to claim 3, wherein the two rocker arm means for a respective valve means abut against the cam shaft means in a scissor-like manner from opposite sides of the respective cam shaft means.

5. The combination according to claim 4, further comprising a short pressure piece interposed between mutually abutting portions of respective two rocker arm means for a corresponding valve means.

6. The combination according to claim 5, wherein mutually abutting rocker arm means are provided with pressure-transmitting surface means and include pivotal support means, said pressure-transmitting surface means being disposed with approximately half the valve stroke in longitudinal planes which intersect substantially the bearing axes of the pivotal support means of the corresponding rocker arm means.

7. The combination according to claim 5, further comprising a flattened ball interposed between respective cooperating rocker arm means, the ball being supported in a spherically shaped socket provided in one of said rocker arm means, and the flattened portion of the ball being in contact with the plane pressure-transmitting surface means of the other rocker arm means.

8. The combination according to claim 7, further comprising a cylinder head and gas channel means arranged therein approximately parallel to the cylinder axis, the rocker arm means abutting against the valve means controlling said gas channel means being pivotally connected in bearing places arranged externally at the walls of the gas channel means and having axes intersecting the gas channel means approximately at right angle.

9. The combination according to claim 8, wherein the rocker arm means abutting against the laterally projecting valve means are arranged substantially in the longitudinal direction of the cylinder row and are guided at the cylinder head outer wall by means of bearing shaft means secured thereon.

10. The combination according to claim 1, wherein mutually abutting rocker arm means are provided with pressure-transmitting surface means and include pivotal support means, said pressure-transmitting surface means being disposed with approximately half the valve stroke in longitudinal center planes which intersect substantially the bearing axes of the pivotal support means of the corresponding rocker arm means.

11. The combination according to claim 10, further comprising a flattened ball interposed between respective cooperating rocker arm means, the ball being supported in a spherically shaped socket provided in one of said rocker arm means, and the flattened portion of the ball being in contact with the plane pressure-transmitting surface means of the other rocker arm means.

12. The combination according to claim 1, further comprising a cylinder head and gas channel means arranged therein approximately parallel to the cylinder axis, the rocker arm means abutting against the valve means controlling said gas channel means being pivotally connected in bearing places arranged externally at the walls of the gas channel means and having axes intersecting the gas channel means approximately at right angle.

13. The combination according to claim 12, and wherein the rocker arm means abutting against the laterally projecting valve means are arranged substantially in the longitudinal direction of the cylinder row and are guided at the cylinder head outer wall by means of bearing shaft means secured thereon.

14. The combination according to claim 1, further comprising a flattened ball interposed between respective cooperating rocker arm means, the ball being supported in a spherically shaped socket provided in one of said rocker arm means, and the flattened portion of the ball being in contact with a plane pressure-transmitting surface means of the other rocker arm means.

15. The combination according to claim 1, further comprising a cylinder head, and wherein the rocker arm means abutting against the valve means, which project laterally, are arranged in the longitudinal direction of the cylinder row, and pivotal support means at the outer wall of the cylinder head for guiding thereon the last-mentioned rocker arm means.

16. The combination according to claim 1, wherein two rocker arm means are provided for the actuation of each valve means which abut against the cam shaft means and against the valve means, respectively.

17. The combination according to claim 16, wherein the two rocker arm means for a respective valve means abut against the cam shaft means in a scissor-like manner from opposite sides of the respective cam shaft means.

18. The combination according to claim 17, further comprising a short pressure piece interposed between mutually abutting portions of respective two rocker arm means for a corresponding valve means.

19. The combination according to claim 1, further comprising a short pressure piece interposed between mutually abutting portions of respective two rocker arm means for a corresponding valve means.

References Cited by the Examiner

UNITED STATES PATENTS

| | | | |
|---|---|---|---|
| 1,277,742 | 9/1918 | Mummert | 123—90 |
| 1,411,208 | 3/1922 | Elliot et al. | 123—90 |
| 1,415,167 | 5/1922 | Fuchs. | |
| 1,477,362 | 12/1923 | Kessler | 123—191 |

FOREIGN PATENTS 174,503   4/1953   Austria.

MARK NEWMAN, *Primary Examiner.*

A. L. SMITH, *Assistant Examiner.*